(12) United States Patent
Bennett (10) Patent No.: US 6,941,796 B2
(45) Date of Patent: Sep. 13, 2005

(54) PACKAGE HANDLING APPARATUS DETECTING PACKAGE HEIGHT

(75) Inventor: Robert Bennett, Walsall (GB)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 10/184,919

(22) Filed: Jul. 1, 2002

(65) Prior Publication Data

US 2003/0015023 A1 Jan. 23, 2003

(30) Foreign Application Priority Data

Jul. 3, 2001 (GB) ............................................. 0116266
Nov. 6, 2001 (GB) ............................................. 0126677

(51) Int. Cl.⁷ .................................................. G01M 3/34
(52) U.S. Cl. .......................................... 73/49.3; 73/52
(58) Field of Search ........................... 73/49.3, 40, 52, 73/41

(56) References Cited

U.S. PATENT DOCUMENTS

| | | | | |
|---|---|---|---|---|
| 4,697,452 A | * | 10/1987 | Prakken ........................ | 73/49.3 |
| 4,771,630 A | * | 9/1988 | Croce et al. ................... | 73/49.3 |
| 4,955,226 A | * | 9/1990 | Beaty et al. ................... | 73/49.3 |
| 5,010,761 A | * | 4/1991 | Cohen et al. ................. | 73/40.7 |
| 5,249,454 A | * | 10/1993 | Kollie et al. .................. | 73/49.3 |
| 5,259,237 A | * | 11/1993 | Aarts ............................ | 73/49.3 |
| 5,266,810 A | * | 11/1993 | Murphy .................. | 250/559.24 |
| 5,284,003 A | * | 2/1994 | Goodman et al. ............. | 53/437 |
| 5,309,750 A | * | 5/1994 | Riley ............................. | 73/52 |
| 5,533,385 A | * | 7/1996 | Frievalt ......................... | 73/49.3 |
| 5,786,530 A | * | 7/1998 | Fenlon .......................... | 73/49.3 |
| 5,788,530 A | * | 8/1998 | Kasai ............................. | 73/49.3 |
| 5,869,747 A | * | 2/1999 | Hulsman ........................ | 73/52 |
| 5,918,270 A | * | 6/1999 | Heuft ............................ | 73/45.4 |
| 5,992,613 A | | 11/1999 | DiFrank ...................... | 198/430 |
| 6,105,419 A | * | 8/2000 | Michels et al. .............. | 73/49.3 |
| 6,202,476 B1 | * | 3/2001 | Fenlon .......................... | 73/49.3 |
| 6,470,733 B1 | * | 10/2002 | Barr ............................. | 73/45.4 |
| 6,474,141 B1 | * | 11/2002 | Takaoka et al. ............. | 73/49.3 |
| 6,568,247 B2 | * | 5/2003 | Taylor ........................... | 73/49.3 |

FOREIGN PATENT DOCUMENTS

| | | | | |
|---|---|---|---|---|
| EP | 1086897 A2 | 3/2001 | ........... | B65B/57/00 |
| EP | 1 086 897 A2 | 3/2001 | | |
| EP | 1 086 897 A3 | 6/2002 | | |
| EP | 1273898 A2 | 1/2003 | | |
| EP | 1273880 A2 | 8/2003 | | |
| EP | 1273880 A3 | 10/2003 | | |

* cited by examiner

Primary Examiner—Hezron Williams
Assistant Examiner—Rodney Frank
(74) Attorney, Agent, or Firm—Staas & Halsey LLP (57) ABSTRACT

An apparatus to test integrity of a seal of a package. The apparatus includes a height detector detecting a height of the package, a test portion determining the integrity of the seal based upon a position of the test portion as a function of time when contacting the package, and a mover moving the test portion into an initial position of contact with the package based upon the detected height. The test portion includes a test head contacting the package, and the mover includes a servo motor driving the test head, and a ball screw linking the servo motor and the test head.

15 Claims, 5 Drawing Sheets

PACKAGE HANDLING APPARATUS DETECTING PACKAGE HEIGHT

CROSS-REFERENCE TO RELATED APPLICATIONS

This application claims priority to UK Application No. 0116266.8, filed Jul. 3, 2001 and UK Application No. 0126677.4, filed Nov. 6, 2001, the disclosures of which are incorporated herein by reference.

BACKGROUND OF THE INVENTION

1. Field of the Invention

The present invention relates to a package handling apparatus, particularly to an apparatus to test the seal quality of gas-filled packages and to prepare the packages for such testing.

2. Description of the Related Art

Many types of apparatus to test the integrity of gas-filled packages, such as flexible pillow type bags filled with chips or other snack foods, have been proposed. Generally, a test head is lowered onto a package to apply a load which will cause a leaky package to deflate. To achieve a measurable effect in a short time, large loads must be applied (e.g. 2.5 kg), with considerable risk of damage to the contents of the package. This system has a high inertia and is therefore slow, inaccurate and inconsistent. Furthermore, this system is difficult to adjust, e.g., for adapting to different package types. Thus, after each test, the head is raised to a maximum height, wasting much time.

SUMMARY OF THE INVENTION

Accordingly, it is an object of the present invention to provide an apparatus which is faster, more efficient, and more adaptable than general designs.

Additional objects and advantages of the invention will be set forth in part in the description which follows and, in part, will be obvious from the description, or may be learned by practice of the invention.

The foregoing and other objects of the invention are achieved by providing an apparatus to test integrity of a seal of a package. The apparatus includes a height detector detecting a height of the package, a test portion determining the integrity of the seal based upon a position of the test portion as a function of time when contacting the package, and a mover moving the test portion into an initial position of contact with the package based upon the detected height. The test portion includes a test head contacting the package, and the mover includes a servo motor driving the test head, and a ball screw linking the servo motor and the test head.

The foregoing and other objects of the invention are also achieved by providing an apparatus to test integrity of a seal of a package, including height detecting means for detecting a height of the package; determining means for determining the integrity of the seal based upon a position of the determining means when contacting the package; and moving means for moving the determining means into an initial position of contact with the package based upon the detected height.

The foregoing and other objects of the invention are also achieved by providing an apparatus to test integrity of a seal of a flexible gas-filled package having a pillow shape, including a conveyor conveying the package through the apparatus; a height detector detecting a height of the package; a test portion determining the integrity of the seal based upon a position of the test portion as a function of time when contacting the package; and a mover moving the test portion into an initial position of contact with the package at a height above the conveyor which is based upon the detected height of the package.

The foregoing and other objects of the invention are also achieved by providing a method to test integrity of a seal of a package, including detecting a height of the package; contacting the package with a testing device, including moving the testing device to contact the package at an initial position of contact determined by the detected height; and determining the integrity of the seal based upon a position of the testing device as a function of time when contacting the package.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
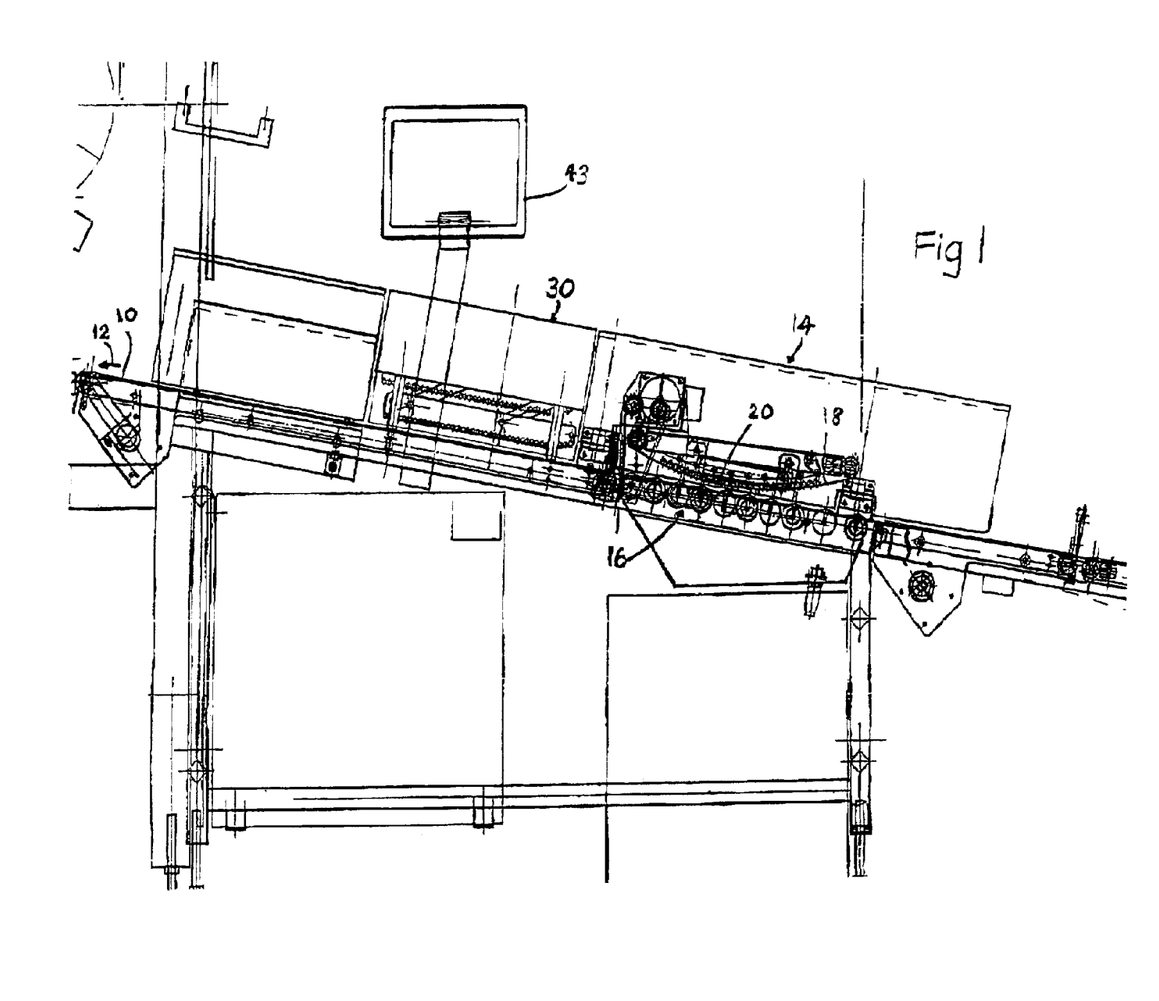
FIG. 1 is a schematic side elevational view of an apparatus according to an embodiment of the present invention.

FIG. 1 shows part of a production line to receive packages 40 (see FIG. 3) from a package filling and sealing apparatus, and to test the packages 40 prior to placement in trays or cartons. As an example, the packages 40 may be flexible pillow type bags filled with articles such as chips or other snack foods. Generally, between the package filling and sealing apparatus (which may be off-line) and the illustrated apparatus, there are one or more intermediate stations, e.g., to orient the packages 40.

The packages 40 are carried on a conveyor belt 10 or other conveying unit having a direction of displacement as shown by the arrow 12. In the embodiment shown in FIG. 1, this conveying direction slopes gently upwards.

The packages 40 are conveyed to a conditioning station 14. Here, the articles are agitated by passage over a rumbling conveyor 16 while being pressed gently from above by an overhead conveyor 18, with a lower run being pressed down by a pressing element 20, having, for example, a catenary shape.

The arrangement of the overhead conveyor 18 and pressing element 20 may be generally as described in application WO 95/32123 to Bennett. This application discloses the use of a rumbling conveyor, in the form of a conveyor belt having two square-section rollers in contact with the underside of the conveyor belt. Upon rotation, the corners of the square section rollers cause the conveyor belt to repeatedly rise and fall in a flapping motion. Although not illustrated herein, this is one arrangement that may be used.

Figure 2A:
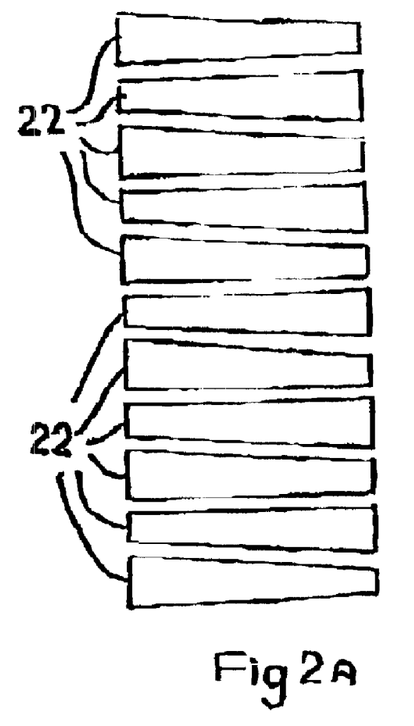
FIGS. 2A and 2B are plan and side elevation views, respectively, of a roller array of the conditioning section of FIG. 1.
Figure 2B:
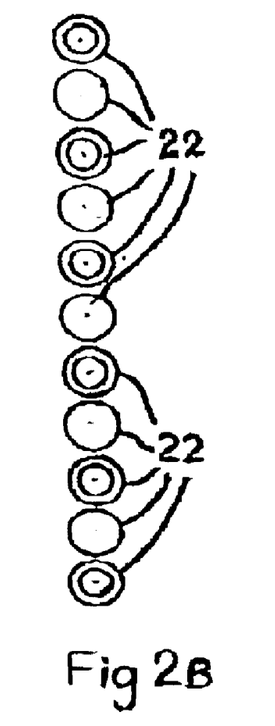

The arrangement of the overhead conveyor 18 and the pressing element 20 may also be as shown in FIGS. 1, 2A and 2B. FIGS. 2A and 2B show a series of tapered rollers 22 having horizontal axes of rotation, alternate rollers 22 tapering on opposite ends but being rotated in the same direction to move the package along while being jolted. This provides a thorough but gentle shaking. Furthermore, the gaps between the rollers 22 allow debris (e.g., chips from broken packages) to fall through, preventing the debris from passing to the next station.

Figure 3:
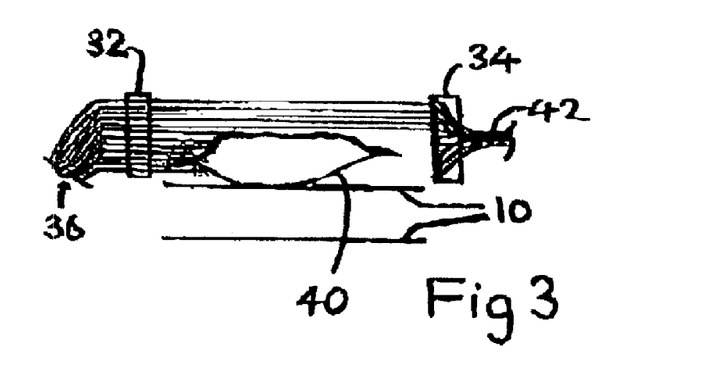
FIG. 3 is a front elevational view of a light curtain device to gauge package height of FIG. 1.

Downstream of the conditioning station 14 is a testing station 30. The packages 40 are conveyed through the testing station 30 on the conveyor belt 10. Before entering the testing station 30, the packages 40 pass through a curtain of light, extending between an emitting array 32, and a photocell array 34, arranged at respective sides of the conveyor belt 10, as shown in FIG. 3. Light, for example, laser light, is conveyed to a vertical line of emission points in the emitting array 32 along a series of fiber optic cables 36, and the individual photocells thereto. Other light transmitting devices may also be used in place of the fiber optical cable 36. As shown in FIG. 3, a package 40 partially occludes the light curtain. The outputs of the photocells are fed along a cable 12 to a remote control unit (RCU) employing a computer 43, or other data processing device (FIG. 1), which uses the output data to identify a maximum height of the package 40. As illustrated herein, the package 40 is generally pillow-shaped after conditioning, with the upper surface of the package 40 being supported primarily by the cushion of gas (air) within the package 40, rather than by contact with the solid articles. Although pillow-shaped packages are described herein, the present apparatus may be used to test gas-filled packages of any shape.

Since the speed of the conveyor belt 10 is known, the passage of the package 40 through the light curtain can also be used to measure the length of the package 40. These measurements can be used to identify the type of package 40 from a range of the packages 40 that differ in dimensions, and whose data have been fed into the computer 43.

The testing station 30 includes a test head 50 (FIG. 4B), and unit to controllably move the test head 50 towards and away from the conveyor belt 10. The test head 50 is shown as having an array of non back-pressure rollers 53 which extend transversely across the conveyor belt 10 and define a main contact surface portion 54. This contact surface portion 54 is parallel with the surface of the conveyor belt 10, bending upwardly at the upstream side to define an angled lead-in surface 56. It is also possible to use a belt driven in synch with the conveyor belt 10.

The test head 50 further includes a body 52, which is mounted to two pairs of levers 58, 60 at each lateral side of the body 52. The lower ends of the lower limbs of corresponding levers 58, 60 are linked by shafts 62. Although the levers 58, 60 generally have an L-shape in FIG. 4A, other shapes are also possible.

Figure 4A:
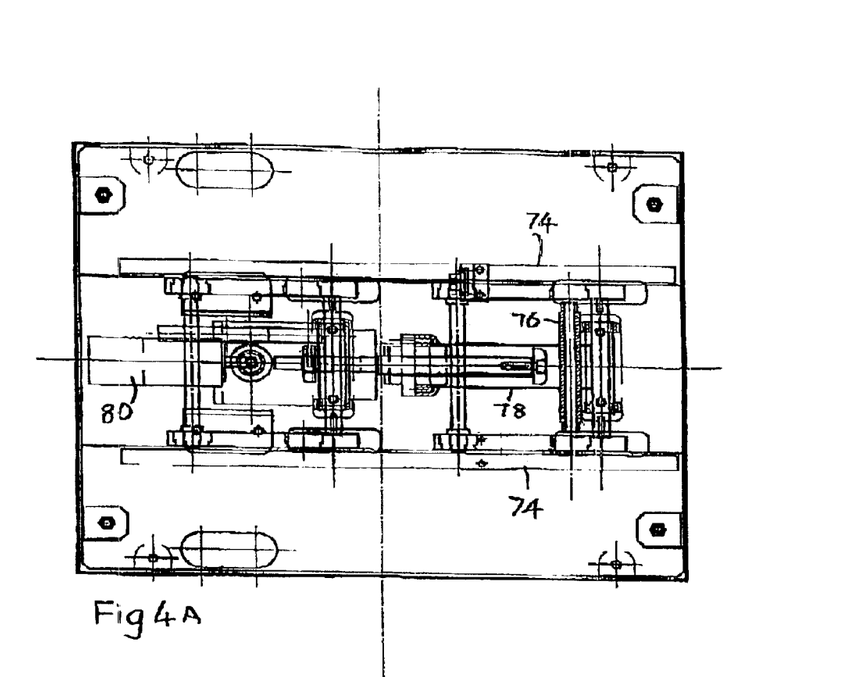
FIGS. 4A and 4B are plan and side elevational views, respectively, of the testing station of FIG. 1.
Figure 4B:
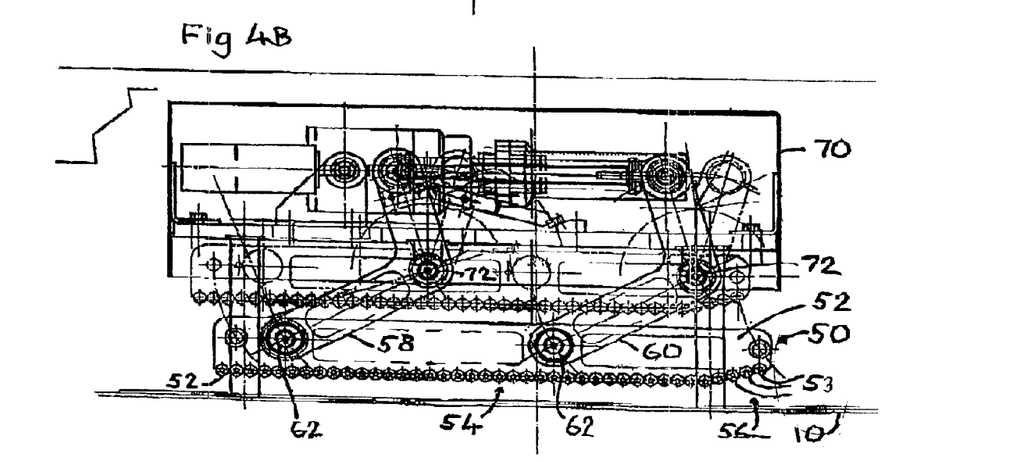

The testing station 30 further includes a fixed body 70. The levers 58, 60 are mounted to the fixed body 70 by pivot shafts 72, which connect corresponding levers 58, 60 at the intersection of their limbs. Thus, the test head 50 is carried by parallelogram linkages, so that it moves with its main contact surface portion 54 maintained parallel with the surface of the conveyor 10. At each side of the testing station 30, the upper limbs of the two levers 58, 60 are linked to a respective longitudinally extending shaft 74 (FIG. 4A). The shafts 74 are linked by a transverse rod 76 which passes through a displaceable piston sleeve 78. The piston sleeve 78 is constrained by the parallelogram linkages to move approximately horizontally (actually, through an arc), and the movement thereof causes pivoting of the levers 58, 60, with concomitant rising or falling of the test head 50.

The piston sleeve 78 is linked to a motor, for example, a servo motor 80, via, for example, a ball screw coupling. This employs a high-resolution load-matched ball screw for maximum sensitivity and reduced backlash. Furthermore, the test head 50 is biased for zero backlash measurements.

The servo motor 80 can be operated in torque control mode, so that an accurately known force is applied downward to the test head 50. This is made possible by the simple and direct mechanical coupling between the servo motor 80 and the test head 50 (via the ball screw and the lever arms). The motor 80 is pivotally mounted to the fixed body 70 through stub shafts and pivots slightly to allow the arcuate movement of the piston sleeve 78.

Figure 5A:
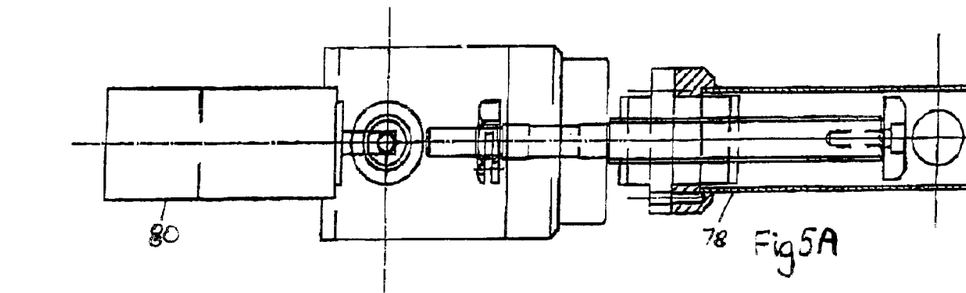
FIGS. 5A and 5B are enlarged plan and side elevational views, respectively, of the actuator assembly of the testing station of FIGS. 4A and 4B.
Figure 5B:
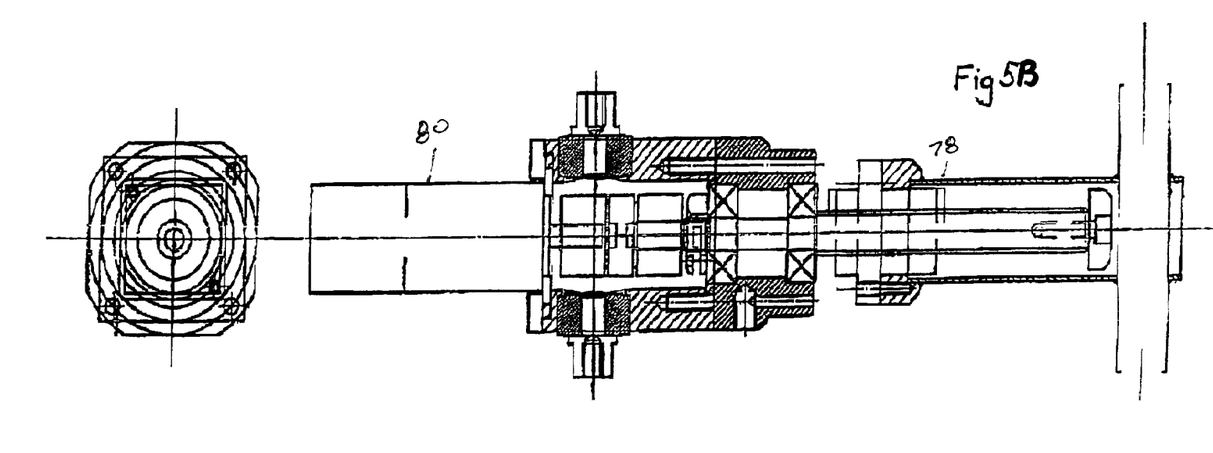

FIGS. 5A and 5B are enlarged views of the servo motor 80, the piston sleeve 78, and the actuation therebetween.

In normal use, the arrival of the package 40 to be tested is detected by the light curtain device, providing data indicating the height of the package 40. This information is used to control the servo motor 80, so that the test head 50 is raised sufficiently to allow the package 40 to pass beneath. The test head 50 does not need to be raised to the maximum height each time. A further possibility is for the heights of a multiplicity of packages 40 to be recorded, and for the computer 43 to determine an expected package height range or "tolerance band". This can be used to provide a standard height to which the test head 50 is raised, and/or to cause rejection of packages 40 which are outside the tolerance band. This could, for example, prevent the test head 50 from being lowered onto debris such as escaped chips which had reached the testing station 30.

Figure 6:
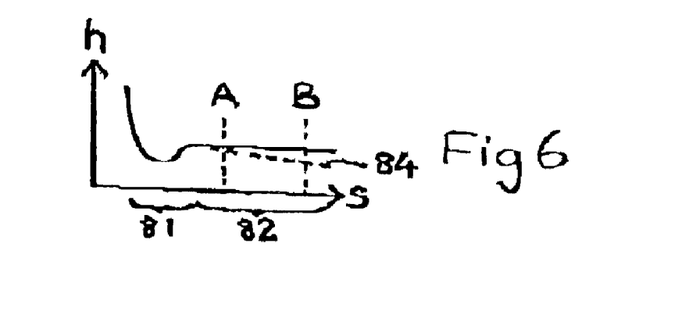
FIG. 6 is a schematic graph showing test results.

When the light curtain has determined that a proper package 40 has passed, the computer 43 can determine precisely when the package 40 will be beneath the test head 50, since the computer 43 also receives data about the speed of the conveyor belt 10. The test head 50 is therefore lowered by actuation of the servo motor 80, in a controlled fashion, with controlled torque. The height of the test head 50 is monitored, generally by monitoring the operation of the servo motor 80. FIG. 6 is a schematic graph showing the height (h) of the test head 50, versus distance (s) traveled by the package 40. Initially, when the test head 50 contacts a balloon-like article, there is a tendency to sink down and rise up again, giving a dip region 81. Furthermore, oscillations are damped by the servo motor 80. For a non-leaking package 40, the dip is followed by a horizontal region 82, as the test head 50 applies a constant torque and is supported at a constant height. However, if the package 40 leaks, the test head 50 will descend, leading to the downward gradient of broken line 84. A leaky package 40 can be detected by noting and comparing the values of the height parameter at two spaced intervals A and B. The test assembly can also be used in a positional speed mode.

To determine the appropriate test torque, a destruction test may be carried out on a package 40 as follows. After conditioning, the package 40 is placed beneath the test head 50, with the conveyor belt 10 stationary. The servo motor 80 is then operated to cause the test head 50 to descend, until the package 40 bursts. The pressure (or torque) at which the bursting happens is noted, and a fraction of this pressure (e.g., 40%) is then used as the standard applied value for testing similar packages 40.

The test head 50 measures both torque and height, which can be done using the servo motor 80. It is also possible to include a load cell to measure torque/pressure values.

The seal test apparatus of the present invention can handle packages 40 very gently, reducing the risk of bursting or scratching. Typically, the load applied is 1.5 kg or less, but greater loads may also be applied. The extremely sensitive height sensing (due to the direct linkage to the servo motor 80 via the ball screw) enables even tiny leaks to be detected, at high travel speeds. An output of 150 packages 40 per minute or more can be achieved.

A conventional apparatus must be mechanically reset each time the product changes or if any parameter is varied. With the present apparatus, changes in height are automatically accounted for by the emitting array 32 and the photocell array 34. If necessary, recalibration of the head 50 is simple, as described above. Specifically, no mechanical alteration is required since the computer 43 controls the torque to be applied by the servo motor 80. The ability to vary the test load to match the type or product provides the 'best-fit' compromise between maximum accuracy of leakage measurement and product fragility. Depending on the application, the user can select between using the maximum possible pressure to detect the smallest leaks or the minimum pressure to minimize product damage or burst packages 40.

The test head 50 is kept in contact with the package 40 only during the test period, thereby minimizing the risk of product jams. The default direction of movement for the test head 50 is upwards, away from the package 40, leaving pathways clear except during power up/down phases.

Stability of test head geometry is crucial due to the fine measurement tolerances required, especially with short contact periods at high speed. Sanitation procedures may require the test head 50 to be removed and replaced occasionally. This can be done precisely without the need for re-calibration. Problems with product debris affecting or causing variations in the home point are eliminated. There is no need to clear product from the machine during start-up as with previous designs. Parameters can be altered 'on-the-fly' and will take immediate effect without the need to stop the machine.

The treatment of 'gross leakers', below minimum height packages 40 and above maximum height packages 40 can be handled individually to suit customer requirements and plant layout. Air divert direction, delay and duration can be individually selected on the remote console of the RCU.

The conveyor belt 10 is accurately controlled to maximize measurement stability and repeatability. Speed can be reduced for longer test periods as typically required for larger packages 40. Speed can be profiled to maximize test times at higher speeds for greater accuracy.

The feedback from the test-head 50 needs to match as closely as possible the height and hence the deflation curve of the product as it passes underneath. Servo feedback or non-contact height measurement may be used to provide an accurate (approximately 1 μm), linear reading.

Figure 7:
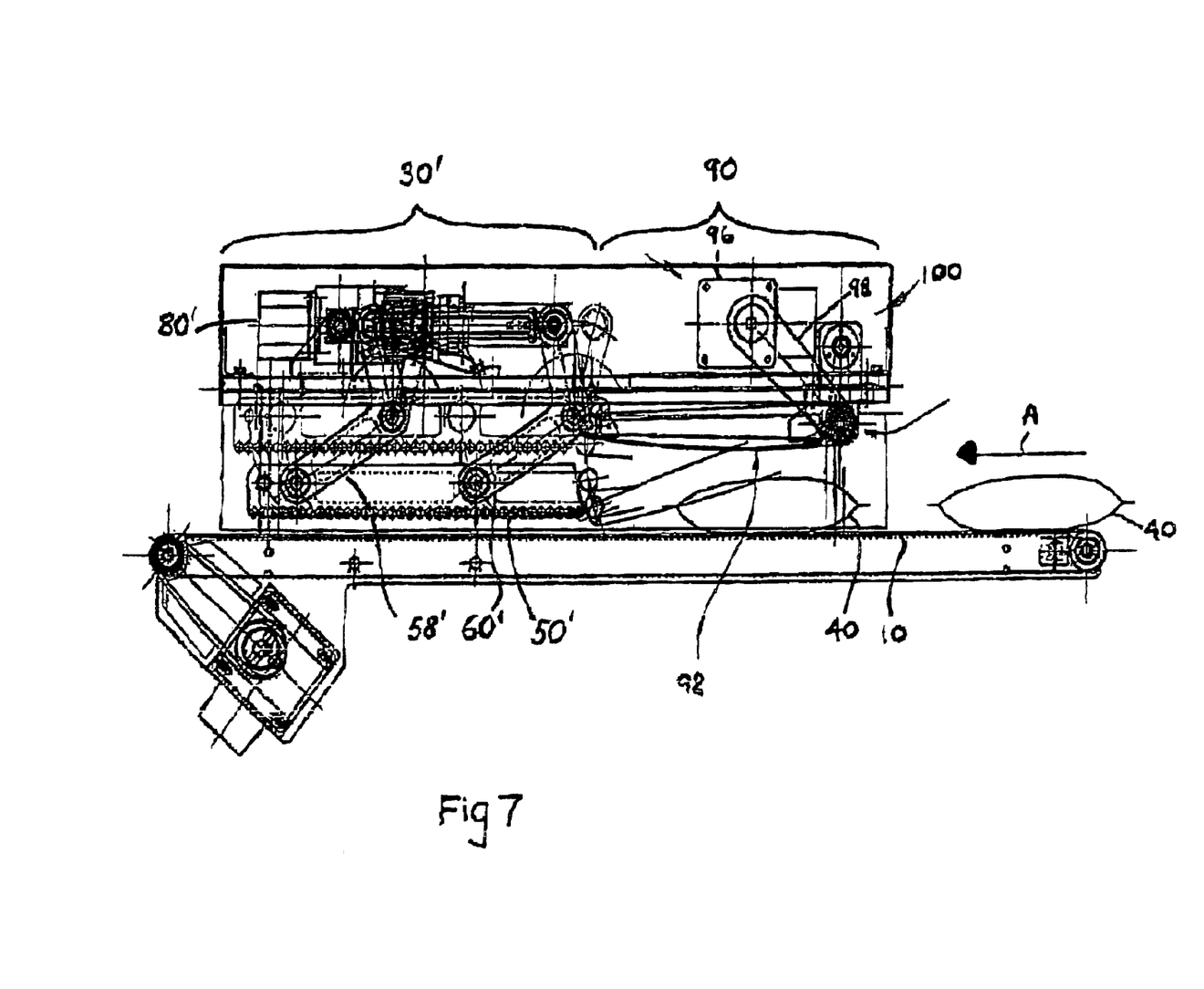
FIG. 7 is a side elevational view showing the testing station of FIG. 1 downstream of a package sensing apparatus, according to an additional embodiment of the present invention.

FIG. 7 shows a test section 30' according to a second embodiment of the present invention, having an associated sensing apparatus 90. The test section 30' may be essentially the same as the test section 30 already described, with a test head 50' mounted on L-shaped levers 58', 60' movable by a servomotor 80'. The sensing apparatus 90 may take the place of the light curtain device 32, 34, and includes a device to contact the packages 40, such as a pivotable endless belt 92 (shown in several angular positions) extending in the package conveying direction (see arrow A). Other contact devices are also possible. The belt 92 is pivotally mounted by a transverse pivot 94 at an upstream or drive side (relative to the package conveying direction A). The belt 92 is driven by a motor 96 or other drive unit, via a linking mechanism such as a drive belt 98. A measuring device, for example, an encoder 100 (in this example a 2000 per rev encoder) measures the angle of the belt 92.

The belt 92 is lightly biased in a counter-clockwise direction so that the free downstream end is close to or in contact with the upper surface of the conveyor belt 10. The package 40 moved by the conveyor 10 enters the nip defined between the conveyor 10 and the pivotable belt 92, and contacts the belt 92, whose surface is moving at substantially the same speed as the conveyor. The contact causes the belt 92 to pivot clockwise sufficiently to allow the package to pass beneath. In the process, the package 40 may undergo some stabilization of its contents. The amount of pivoting is measured by the encoder 100. This provides data to control the servo motor 80 of the test section 30' to position the test head 50' appropriately.

This device enables package 40 to be fed into the test section 30' smoothly. The test head 50' is positioned to the correct height for each package 40 by feedback from the encoder 100. This allows a much more controlled application of the test head 50' force onto the package 40. Feedback is consistent because the package 40 will be stabilized to some extent by the pivotable belt 92. The belt assembly has been designed to be as light as possible to prevent seal damage or popping of packages 40 caused by the inertia of the present heads.

The light curtain device is described as including fiber optic cables, laser light, and photocells. However, the present invention is not limited to any particular type of radiation, emitter or detector. The sensing apparatus 90 is described as including endless belt 92, motor 96, drive belt 98, and encoder 100. However, the present invention is not limited to any particular type of contact surface, drive source, force transfer device, or measurement device. The testing station 30 is described as including levers 58, 60 and rollers 53, however, the present invention is not limited to any particular type of moving device. The present description also includes a servo motor 80, and a ball screw, however, the present invention is not limited to any particular type of drive source or force transferring device.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An apparatus to test integrity of a seal of a package, comprising:

height detecting means for detecting a height of the package;

moving means for moving a contact member to a height greater than the height of the package and to an initial position of contact with the package based upon the detected height; and determining means for determining the integrity of the seal based upon a change in position of the contact member from the initial position of contact over time, wherein the height detecting means comprises:

a contact surface contacting the package and pivoting as a result of the contacting, and a pivot detector detecting a degree of the pivoting and determining the height of the package therefrom.

2. An apparatus to test integrity of a seal of a package, comprising:
a height detector detecting a height of the package;
a mover moving a contact member to a height greater than the height of the package and to an initial position of contact with the package based upon the detected height;
a test portion determining the integrity of the seal based upon a change in position of the contact member from the initial position of contact over time,
wherein the height detector comprises:
a contact surface contacting the package and pivoting as a result of the contacting, and
a pivot detector detecting a degree of the pivoting and determining the height of the package therefrom.

3. The apparatus of claim 2, wherein the contact member comprises a test head, and the mover comprises:
a servo motor driving the test head; and
a ball screw linking the servo motor and the test head.

4. The apparatus of claim 3, wherein the test portion determines the integrity of the seal based upon a force applied by the servo motor on the test head.

5. The apparatus of claim 3, further comprising a conveyor conveying the package through the apparatus.

6. The apparatus of claim 2, wherein the contact surface is an endless belt.

7. The apparatus of claim 2, wherein the pivot detector is an encoder.

8. The apparatus of claim 3, wherein the ball screw is a high-resolution load-matched ball screw.

9. An apparatus to test integrity of a seal of a flexible gas-filled package having a pillow shape, comprising:
a conveyor conveying the package;
a height detector detecting a height of the conveyed package;
a mover moving a contact member to a height greater than the height of the package and to an initial position of contact with the package at a height above the conveyor which is based upon the detected height of the package;
a test portion determining the integrity of the seal based upon a change in position of the contact member from the initial position over time,
wherein the height detector comprises:
a contact surface contacting the package and pivoting as a result of the contacting, and
a pivot detector detecting a degree of the pivoting and determining the height of the package therefrom.

10. The apparatus of claim 9, wherein:
the apparatus tests the integrity of the seals of a plurality of the packages,
the conveyor conveys a next one of the plurality of the packages to the height detector,
the height detector detects a height of the next one of the packages, and
the mover moves the contact member to an initial position of contact with the next one of the packages at a height above the conveyor which is based upon the detected height of the next one of the packages.

11. A method to test integrity of a seal of a package, comprising:
detecting a height of the package;
moving a contact member to a height greater than the height of the package and to an initial position of contact with the package determined by the detected height;
determining the integrity of the seal based upon a change in position of the contact member from the initial position as a function of time,
wherein the detecting of the height comprises:
contacting the package with a pivot portion,
pivoting the pivot portion as a result of the contact with the package,
detecting a degree of the pivoting of the pivot portion, and
determining the height of the package from the detected degree of pivoting.

12. The method of claim 11, further comprising:
placing a test package under the contact member;
applying an increasing load to the test package with the contact member until the test package bursts; and
applying a load to subsequent ones of the packages that is a fraction of the load applied to the test package.

13. A method to test integrity of a seal of a package, comprising:
detecting a height of the package;
setting an initial position of contact between a contact, member and the package depending on a type of the package, so as to avoid an extra movement of the contact member based on a detecting speed; and
moving the contact member at the initial position of contact and determining the integrity of the seal based upon a change in the position of the contact member from the initial position as a function of time,
wherein the detecting of the height comprises:
contacting the package with a pivot portion,
pivoting the pivot portion as a result of the contact with the package,
detecting a degree of the pivoting of the pivot portion, and
determining the height of the package from the detected degree of pivoting.

14. An apparatus to test integrity of a seal of a package, comprising:
height detecting means for detecting a height of the package;
moving means for moving a contact member to an initial position having a height greater than the height of the package; and
determining means for determining the integrity of the seal based upon a change in position of the contact member from the position of contact over time,
wherein the height detecting means comprises:
a contact surface contacting the package and pivoting as a result of the contacting, and
a pivot detector detecting a decree of the pivoting and determining the height of the package therefrom.

15. An apparatus to sense a height of packages, comprising:
a conveyor to convey the packages;
a contact element to be pivoted by the conveyed packages, the contact element comprising:
a first end, and
a second end downstream from the first end in a direction of conveyance of the packages and closer to the conveyor than the first end; and
a sensor to determine an amount of the pivoting of the contact element to thereby determine a height of the packages.

* * * * *

UNITED STATES PATENT AND TRADEMARK OFFICE
CERTIFICATE OF CORRECTION

PATENT NO. : 6,941,796 B2
DATED : September 13, 2005
INVENTOR(S) : Robert Bennett

It is certified that error appears in the above-identified patent and that said Letters Patent is hereby corrected as shown below:

<u>Title page,</u>
Item [75], Inventer, delete "Walsall" and insert -- West Midlands --.

<u>Column 8,</u>
Line 21, delete "contact," and insert -- contact --.
Line 50, delete "decree" and insert -- degree --.

Signed and Sealed this

Eighteenth Day of April, 2006

JON W. DUDAS
*Director of the United States Patent and Trademark Office*